United States Patent Office 2,763,189
Patented Sept. 18, 1956

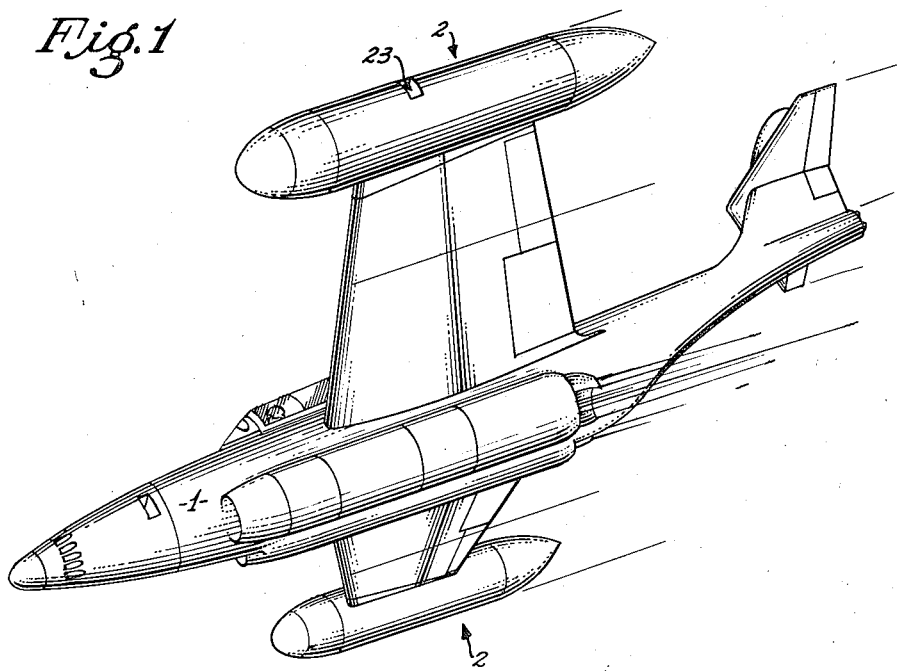
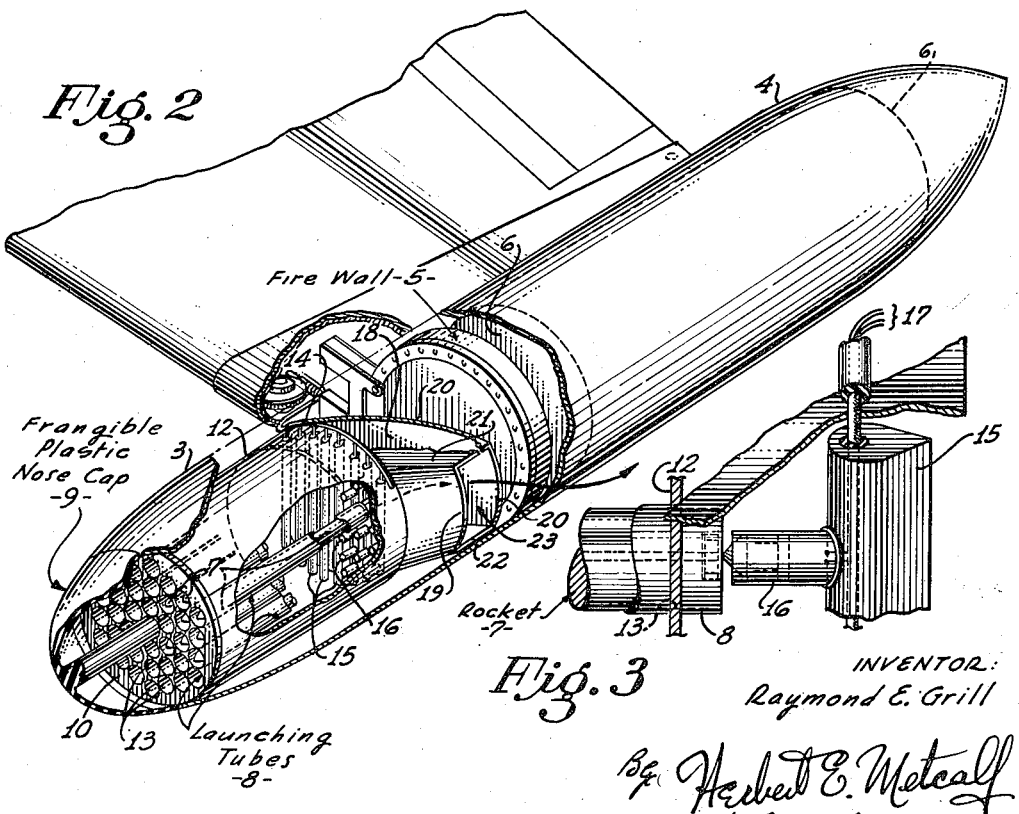

2,763,189

ROCKET AND FUEL POD

Raymond E. Grill, Long Beach, Calif., assignor to Northrop Aircraft, Inc., Hawthorne, Calif., a corporation of California Application August 30, 1952, Serial No. 307,285

4 Claims. (Cl. 89—1.7)

This invention relates to a combined rocket launcher and fuel pod and more particularly to such a combination associated with a streamlined portion of an airplane in which means are provided for safely conducting and deflecting exhaust gases to the atmosphere from a rocket mounted and fired within the streamlined portion.

In military planes it is conventional practice to mount rockets or missiles on the underside of the wings with their axis parallel with the longitudinal center line of the plane. This method increases the frontal area of the airplane and materially increases its parasite drag. It is also conventional to mount fuel storage tanks on wings of military aircraft, as in wing nacelles or wing tip pods, however, when both rockets and fuel storage tanks are associated with the same wing section they are remotely positioned with respect to each other. Positioning fuel and rockets in the same streamlined structure, as disclosed in the present invention, has hitherto been considered dangerous and impractical due to their close proximity and the resulting possibility of rocket exhaust gas igniting the fuel. Safe conduction of exhaust gases to the atmosphere has presented numerous obstacles which have been successfully overcome by applicant, one preferred embodiment being disclosed in the present invention.

It is, therefore, an object of the present invention to provide a streamline structure for an airplane, such as a wing tip pod or wing nacelle, in which rockets are mounted and a storage space for fuel is also provided.

A further object is to provide efficient and economical means for safely and harmlessly directing rocket exhaust gases to the atmosphere when a rocket is fired from within a streamline structure of an airplane.

A further object is to provide a streamline plenum chamber devoid of any obstructions which will retard the flow of exhaust gases from a rocket fired within a streamline structure of an airplane.

A further object is to provide a combined rocket launching device and fuel storage space in which the parasite drag of an airplane with which they are associated is no greater than if only one of the elements were present.

Other objects and advantages of this invention will be apparent from the following description forming a part of this specification, but the invention is not limited to the embodiment herein described, as various forms may be adopted within the scope of the appended claims.

Throughout the specification and claims of the present application the word "rocket" includes both guided and unguided reaction driven or self propelled missiles.

The invention may be more fully understood by reference to the accompanying drawings, wherein:

Figure 1 is a perspective view of an airplane having wing tip pods in which both rockets and fuel storage space is provided and in which the gas exhausting device of the present invention is incorporated.

Figure 2 is an enlarged perspective view of one of the wing tip pods shown in Figure 1 partly in section to show its internal construction.

Figure 3 is a fragmentary sectional view of the igniter device of the present invention.

Referring first to Figure 1 a jet driven airplane 1 is fitted with wing tip pods 2, the forward portion 3 being used for mounting rockets while engine fuel is carried in the aft portion 4. The outer surface of the fore and aft portions of the wing tip pod are continuous to provide a streamline surface.

As shown in Figure 2 the fore and aft portions of the pod 2 are separated by a heat resisting bulkhead or fire wall 5, a cylindrical fuel tank 6 being positioned in the aft portion 4 of the wing tip pod.

A plurality of rockets 7 are mounted in the forward portion of pod 2, in rocket launching tubes 8, having their axis generally parallel with the longitudinal axis of the wing tip pod and airplane. The extreme forward portion of pod 2 comprises a frangible nose section 9 of rounded configuration which completes the streamline contour of the pod. Positioned a short distance aft of the nose section is a circular plate 10 having its circular face normal to the longitudinal axis of the pod. Another circular plate 12 is similarly positioned aft of plate 10 but forward of fire wall 5. A plurality of circular apertures 13 in plates 10 and 12 are concentrically arranged with respect to the longitudinal axis of pod 2. It should also be noted that apertures 13 are further arranged in horizontally spaced vertical rows for a purpose which will be apparent later. Launching tubes 8 are fixedly mounted in apertures 13 of plates 10 and 12, respectively.

A rocket exhaust plenum chamber 18 is located adjacent the aft side of plate 12. The plenum chamber is defined by plate 12, a wall portion of pod 2, two generally arcuate vertically positioned plates 19 and 20, an upper plate 21 and a lower plate 22. The plates 19, 20, 21 and 22 are joined in fluid tight relation at their respective abutting edges, their forward ends being secured, as by welding, to the inner peripheral surface of pod 2 a short distance aft of plate 12. Chamber 18 extends rearwardly and laterally, diminishing in cross-sectional area, and terminating in a port 23 located in the side wall of pod 2 forward of fire wall 5, as shown in Figure 2.

A plurality of igniters 16 positioned in chamber 18 contact the aft end of the rockets. Electrical connectors 17 extend from each igniter to the cockpit of the plane where switch means (not shown) are provided whereby the igniters may be energized. The igniters are supported from a plurality of horizontally spaced vertical members 15, one member being positioned directly aft of each vertical row of rockets. Members 15 are streamline in cross-section and constructed of a highly heat resisting material, a bore extending longitudinally thereof provides a passageway for the electrical connectors 17. So constructed and arranged members 15 offer very little resistance to exhaust gases flowing through chamber 18 and also protect connectors 17 from the heat of the gases. The upper end portions of members 15 are joined to arcuate element 14 located adjacent the inner peripheral surface of pod 2. Element 14, constructed of the same material as elements 15, affords additional insulation for connectors 17 as they pass from plenum chamber 18.

In operation rockets are loaded from the forward end of their respective launching tubes, the rockets being retained in their firing position by conventional securing means (not shown). Frangible nose section 9 is then secured to the forward end of pod 2 to complete its streamlined contour.

Rockets are fired by energizing one or more of the igniters 16 as desired. As the first rocket fired moves forward it breaks the frangible nose section 9 thereby providing free passage for subsequently fired rockets. Exhaust gases from a fired rocket flows laterally to the atmosphere via plenum chamber 18 and port 23. The chamber provides a continuous passageway free of abrupt turns and obstructions which gradually decreases in cross sectional area toward port 23. Such a plenum chamber offers negligible resistance to the flow of rocket exhaust gases. Members 15, which are the only structural elements in the path of the exhaust gas, likewise offer negligible resistance to the gases as they are also streamlined as described above.

From the above description it will be apparent there is disclosed a streamlined structure for an airplane in which the rockets are mounted for firing and also a storage space for fuel is provided, the parasite drag being no greater than if only one of the elements were present, and also having means for safely conducting hot rocket exhaust gases to the atmosphere so that the fuel will not be affected thereby.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms of modifications within the legitimate and valid scope of the appended claims.

What is claimed is:

1. In an airplane, a rocket launching device comprising: an elongated streamlined structure adapted to be attached to an exterior portion of said airplane; said structure having an exterior side surface facing in a direction away from the fuselage of said airplane at such times as said structure is attached to said airplane; a fire resistant wall extending laterally across said structure to provide a rocket compartment forwardly of said fire wall; a plurality of rocket launching tubes mounted in said compartment so that the axes of said tubes are generally parallel to the longitudinal axis of said airplane; said tubes opening rearwardly ahead of said fire wall; and means defining a common exhaust channel extending between the rear openings of said tubes and said side surface whereby exhaust gases from rockets fired from said tubes are exhausted harmlessly into the airstream passing said airplane.

2. In an airplane, a rocket container comprising: an elongated generally cylindrical and streamlined pod attached to said airplane with the axis of said pod extending generally parallel to the longitudinal axis of said airplane; a fire resistant wall mounted in said pod at approximately the mid-portion thereof and extending normal to the axis of said pod to provide a forward chamber and a rear chamber in said pod; a plurality of rocket launching tubes mounted in said forward chamber and extending generally parallel to the axis of said pod; said tubes opening rearwardly ahead of said fire wall; means defining a common exhaust gas channel extending between the rear openings of said tubes and a lateral exterior surface of said pod facing in a direction away from the fuselage of said airplane.

3. In an aircraft, a rocket container comprising: an elongated generally cylindrical and streamlined pod attached to said airplane with the axis of said pod extending generally parallel to the longitudinal axis of said airplane; a fire wall mounted in said pod at approximately the mid portion thereof and extending normal to the axis of said pod to provide a forward section and a rear section; a plurality of rocket launching tubes mounted in said forward section with their axes extending generally parallel to the axis of said pod; said tubes opening rearwardly ahead of said fire wall; means defining a plenum chamber in said pod at the rear of said tubes and ahead of said fire wall, the aft ends of said tubes being in fluid communication with said plenum chamber; means defining an exhaust gas channel extending generally normal to the axis of said pod and between said plenum chamber and an exterior surface of said pod; said exterior surface facing in a direction away from the fuselage of said airplane; and a plurality of supporting means at the rear opening of said tubes for supporting rocket ignition means, said supporting means being spaced with respect to each other and the aft ends of said tubes to provide free gas passage past said supporting means and into said plenum chamber.

4. In an airplane, a rocket container comprising: an elongated generally cylindrical and streamlined pod attached to said airplane with the axis thereof extending generally parallel to the longitudinal axis of said airplane; a fire resisting wall mounted in said pod at approximately the mid-portion thereof and positioned normal to the axis of said pod to provide a forward chamber and a rear chamber in said pod; a plurality of rocket launching tubes mounted in said forward chamber with the axis thereof extending generally parallel to the axis of said pod; said tubes opening rearwardly in a common plane normal to the axis of said pod; means defining a plenum chamber in said pod located at the rear of said tubes and spaced ahead of said fire wall, the aft ends of said tubes being in fluid communication with said plenum chamber; and means defining an exhaust gas channel spaced from said fire wall and extending between said plenum chamber and an exterior surface of said pod at a position ahead of said fire wall; and said exterior surface facing in a direction away from the fuselage of said airplane.

References Cited in the file of this patent

UNITED STATES PATENTS

| 2,273,839 | De Port et al. | Feb. 24, 1942 |
|---|---|---|
| 2,398,871 | Turnbull et al. | Apr. 23, 1946 |
| 2,402,632 | Ivanovic | June 25, 1946 |
| 2,428,359 | De Permentier | Oct. 7, 1947 |
| 2,454,806 | Kemmer et al. | Nov. 30, 1948 |
| 2,546,823 | Holloway | Mar. 27, 1951 |
| 2,609,730 | Bergstrom | Sept. 9, 1952 |

FOREIGN PATENTS

| 924,013 | France | July 24, 1947 |